United States Patent [19]

Chandra et al.

[11] Patent Number: 5,613,774
[45] Date of Patent: Mar. 25, 1997

[54] COOKING POT ENCLOSING ROTATABLE SPHERICAL CHAMBER

[75] Inventors: Naveen Chandra, 10 Milland Dr., #A-5, Mill Valley, Calif. 94941; Kenneth Tarlow, Corte Madera, Calif.

[73] Assignee: Naveen Chandra, Mill Valley, Calif.

[21] Appl. No.: 576,339

[22] Filed: Dec. 21, 1995

[51] Int. Cl.⁶ .................................................... B01F 9/02
[52] U.S. Cl. .......................... 366/228; 366/234; 99/348
[58] Field of Search ............................. 366/54, 56, 57, 366/146, 220, 225–228, 234; 99/348

[56] References Cited

U.S. PATENT DOCUMENTS

| | | | |
|---|---|---|---|
| 21,387 | 8/1858 | Tower | 366/220 |
| 23,867 | 5/1859 | Simmons | 366/220 X |
| 24,024 | 5/1859 | Harrington | 366/220 |
| 361,660 | 4/1887 | Witherell | 366/228 X |
| 525,905 | 9/1894 | Jensen | 366/228 X |
| 560,808 | 5/1896 | Macy | 99/348 X |
| 1,162,859 | 12/1915 | Guillot | 355/234 |
| 1,430,012 | 9/1922 | Heiser | 99/348 X |
| 1,638,886 | 8/1927 | Sherbondy et al. | 366/225 X |
| 2,103,009 | 12/1937 | Klein | 366/225 X |
| 2,795,404 | 6/1957 | Cornell, Jr. | 366/225 X |
| 3,081,070 | 3/1963 | Welsch | 366/228 |
| 3,357,685 | 12/1967 | Stephens | 366/348 X |
| 4,173,925 | 11/1979 | Leon | 366/220 X |
| 5,372,422 | 12/1994 | Dubroy | 99/348 X |

FOREIGN PATENT DOCUMENTS

| | | | |
|---|---|---|---|
| 971531 | 1/1951 | France | 366/220 |
| 2435239 | 5/1980 | France | 366/220 |

*Primary Examiner*—Charles E. Cooley
*Attorney, Agent, or Firm*—Jack Lo

[57] ABSTRACT

A cooking pot enclosing a rotatable spherical chamber includes a pot body. A cover is provided on an open top of the pot body to define an enclosed space. A removable, spherical chamber assembly is rotatably suspended within the pot body by a pair of opposite shafts. One shaft end is driven by a mating gear connected to a gear train and motor located external to the pot body. Food is placed in the spherical chamber assembly, which is then placed in the pot body. The pot body is filled with several inches of water, and placed on a stove or other heating element. The spherical chamber assembly is suspended above the boiling water, and is rotated by the motor and gear train, which causes the food to tumble and therefore cook evenly and quickly. Baffles affixed to the interior side walls of the spherical chamber assembly further enhance the mixing action.

8 Claims, 8 Drawing Sheets

COOKING POT ENCLOSING ROTATABLE SPHERICAL CHAMBER

BACKGROUND OF THE INVENTION

1. Field of the Invention

This invention relates generally to cooking tools, more particularly to a cooking pot enclosing a rotatable spherical chamber.

2. Prior Art

Continuous manual stirring of the contents of a cooking pot is often necessary, particularly when stewing or when cooking thick soup with a heavy concentration of solid food. Such stirring activity is required so that heat may be evenly distributed to prevent scorching of the solid food, and to prevent the solid food from sticking to the bottom of the cooking pot. Manual stirring of the contents of the cooking pot, however, is tiring and time consuming. Therefore, there is a need to provide a cooking pot which is capable of stirring or mixing automatically the contents therein.

Other inventions have been developed which attempt to solve the problem of manual stirring. These all include a pot having at least one stirring paddle or blade to keep the food moving, so as to evenly cook the contents, and reduce the chance of burning the food at the bottom of the pot. These automatic stirring blades, however, have certain drawbacks and limitations. One is that a relatively large amount of power is necessary to stir viscous foods, such as stew, thick sauces, or rice. A large motor and gear reduction system are thus required, which are expensive and cannot be run for any extended period of time when using replaceable or rechargeable, low voltage batteries as a power source.

Typical prior art food stirrers mix food unevenly. The stirring blades may mix food at the blade level, but foods above or below the blade may receive less mixing. The stirring blades tend to push the food around, rather than actually causing food to be mixed. Foods such as rice and vegetables may require a steaming action as well as a stirring action, which prior art food stirrers cannot provide. Another problem with stirring blades is that they have to be perfectly adjusted to a fine clearance with respect to the inside surface of the pot, so that they can wipe its bottom and lower sides. If not, the blades will not stir all of the food at the bottom of the pot, which causes some food to remain stationary and possibly burn.

SUMMARY OF THE INVENTION

Therefore the object of the present invention is to provide a cooking pot enclosing a rotatable spherical chamber which mixes food more evenly than a stirring blade.

Another object of the present invention is to provide a cooking pot enclosing a rotatable spherical chamber that can mix relatively viscous foods with a relatively low power motor.

Another object of the present invention is to provide a cooking pot enclosing a rotatable spherical chamber which is capable of steaming foods as well as mixing them.

Another object of the present invention is to provide a cooking pot enclosing a rotatable spherical chamber in which the mixing chamber is removable and interchangeable with other chambers for meeting different types of cooking requirements.

Another object of the present invention is to provide a cooking pot enclosing a rotatable spherical chamber which does not depend on stirring blades, and therefore eliminates the problem of poorly fitting stirring blades with relation to the bottom surface of the cooking pot.

Accordingly, the present invention includes a pot body having an open top and a closed bottom; a cover provided on the open top of the pot body and defining an enclosed space; a spherical cooking chamber having opposite shafts protruding perpendicularly from the center side walls. The spherical cooking chamber slips into the open topped pot, and is held in a suspended fashion when the two opposing shafts are seated in opposite "U" shaped slots affixed to the inside walls of the open topped pot.

A gear, or other similar drive means, fixedly mounted to one shaft of the spherical pot mates with a second gear, or similar drive means, positioned inside the pot. The second gear is connected to a series of speed reducing gears arranged in a housing outside the pot. The speed reducing gears are driven by an electric motor. When the motor is turned on, the spherical pot is driven to rotate slowly about its axis.

A plurality of perpendicularly disposed baffles are attached to the inside wall of the spherical cooking chamber. When the spherical chamber rotates, the enclosed food is temporarily restricted by the baffles thereby enhancing the mixing action. The rotation of the spherical cooking chamber causes the food located inside to tumble and thereby become mixed. The manner of mixing requires relatively little power because there is no frictional opposition to the rotating motion, as would be the case in a pot with stirring blades.

DESCRIPTION OF THE PREFERRED EMBODIMENT

Figure 1:
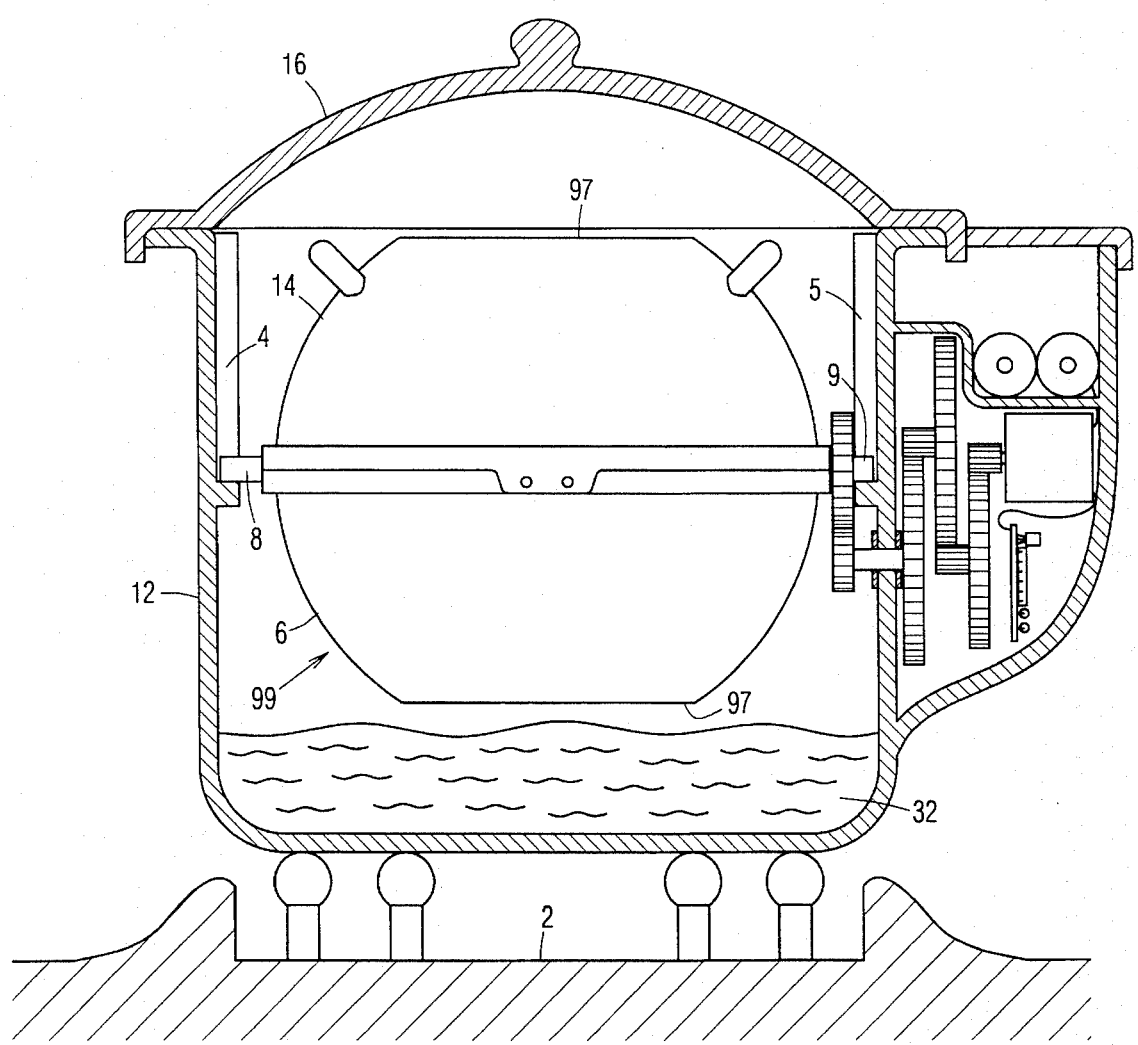
FIG. 1 is a front cutaway view of a cooking pot enclosing a rotatable spherical chamber in accordance with a first embodiment of the present invention.

As shown in FIG. 1, a cooking pot 12 sits on a conventional stove top 2, which can be either electric or gas powered. A spherical cooking chamber assembly 99 is rotatably suspended in pot 12 by opposite shafts 8 and 9 respectively supported in U-shaped slots 4 and 5 on the sides of pot 12. Lid 16 covers the top of pot 12, thereby enclosing it and retaining heat. Several inches of water 32 are received in pot 12. When stove top 2 becomes hot, it causes water 32 to boil and creates steam, which evenly heats the interior of enclosed cooking pot 12. Spherical chamber assembly 99 includes two hemispherical halves 14 and 6, which have flattened portions 97 that allow chamber assembly 99 to sit on a table top without rolling around.

Figure 2:
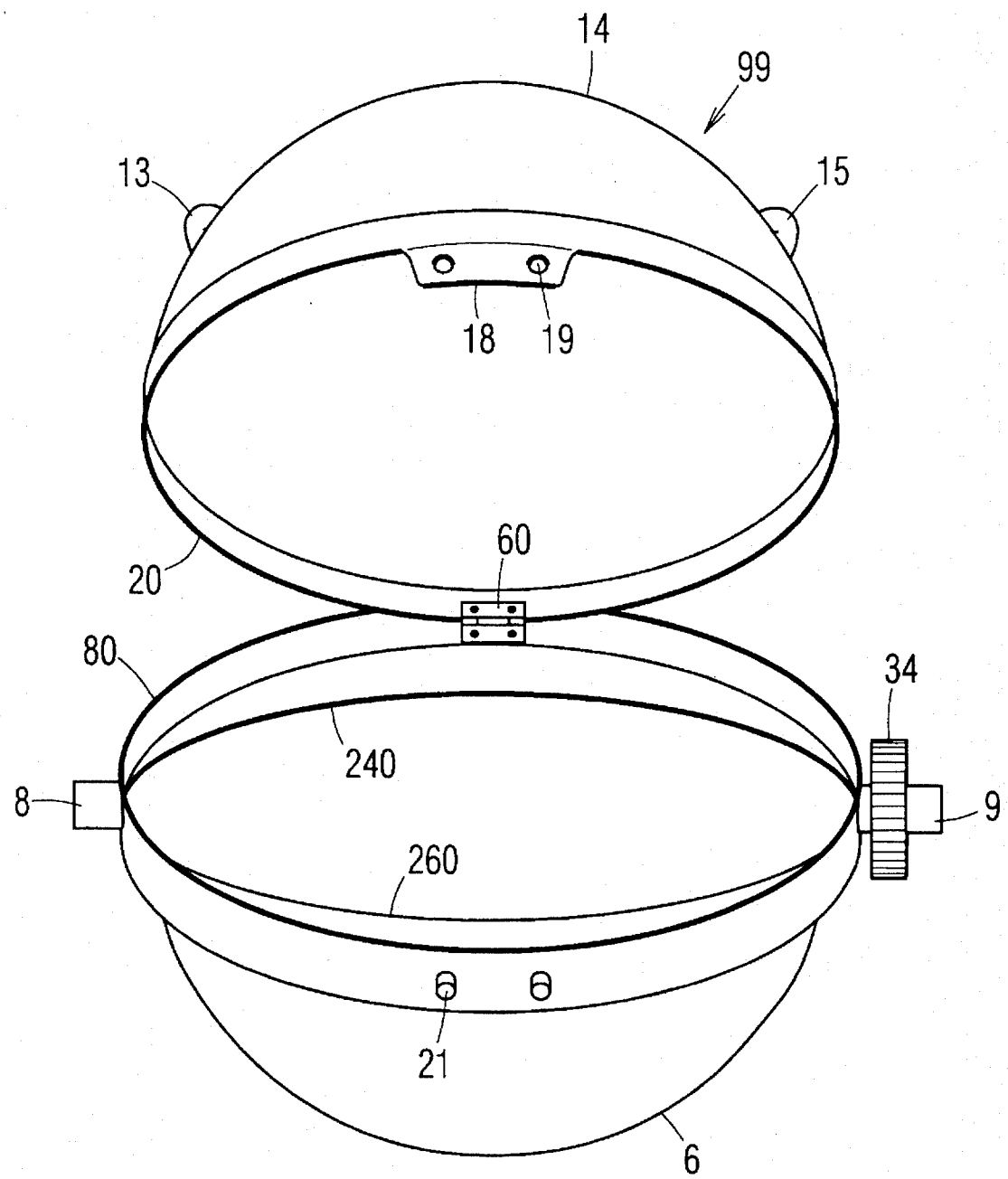
FIG. 2 is a front perspective view of a spherical chamber in an open position.

As shown in FIG. 2, resilient gaskets 20 and 80 respectively surround the outer rim of hemispherical halves 14 and 6, which are hingeably connected on the back side by a hinge 60. A tab 18 protrudes down from the front side of gasket 20. Holes 19 in tab 18 mate with pins 21 protruding perpendicularly from gasket 80 for locking hemispheres 14 and 6 together. Gaskets 20 and 80 seal hemispheres 14 and 6, so that the food contents (not shown) located inside spherical chamber assembly 99 cannot spill out, even if those contents are liquid.

Baffles 240 and 260 are fixedly mounted perpendicularly to the interior side walls of hemisphere 6. Baffles 240 and 260 cause the food to temporarily collect during rotation of spherical chamber assembly 99, thereby enhancing the mixing action taking place therein. Shafts 8 & 9 are fixedly attached perpendicularly to the left and right sides, respectively, of hemisphere 6. Gear 34 is fixedly attached to shaft 9. Handles 13 and 15 attached to hemisphere 14 allow a user to easily lift spherical chamber assembly 99.

Figure 3:
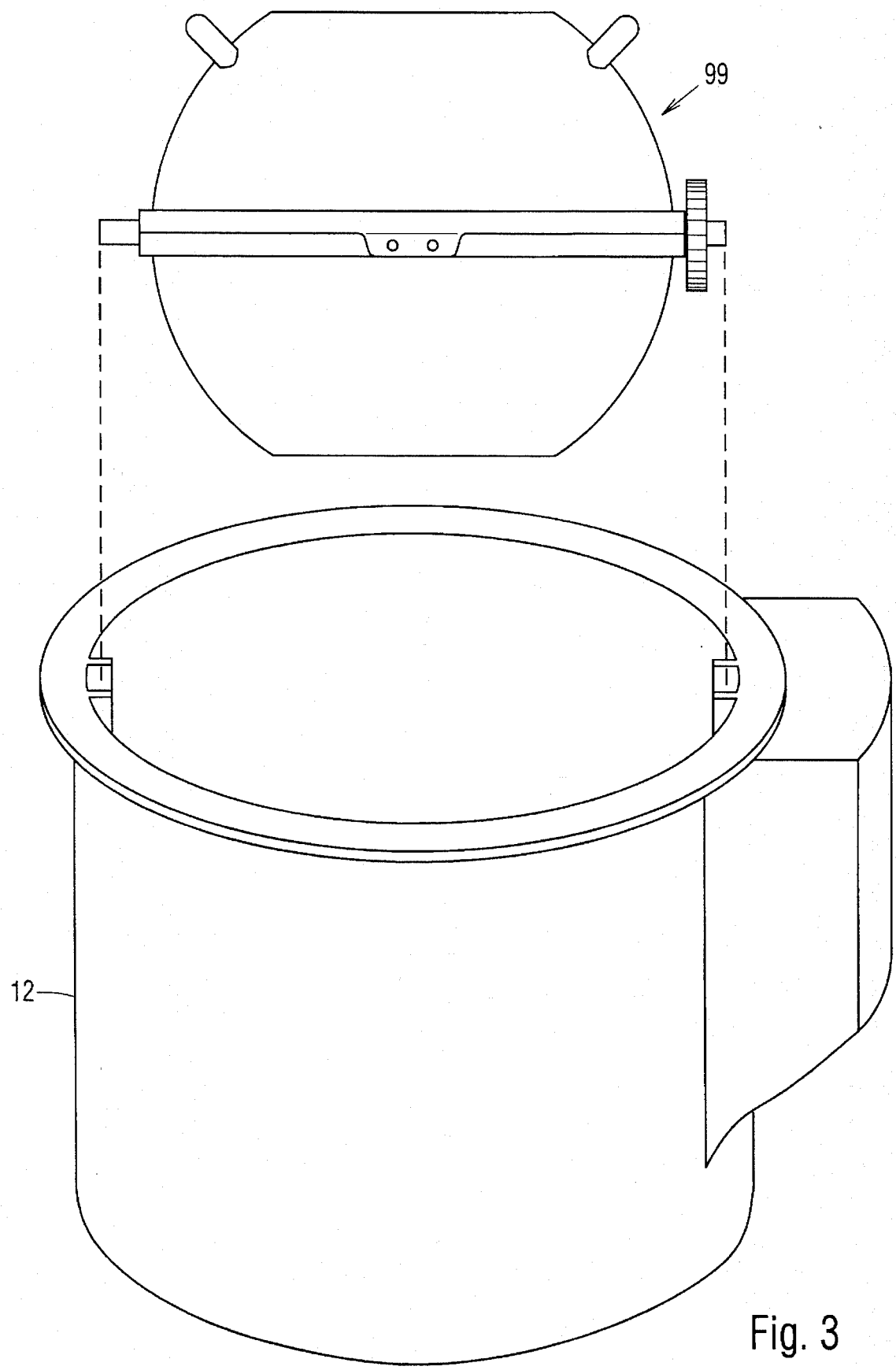
FIG. 3 is a front perspective view of the spherical chamber being lowered into the cooking pot.

FIG. 3 shows spherical chamber assembly 99 being lowered into pot 12.

Figure 4:
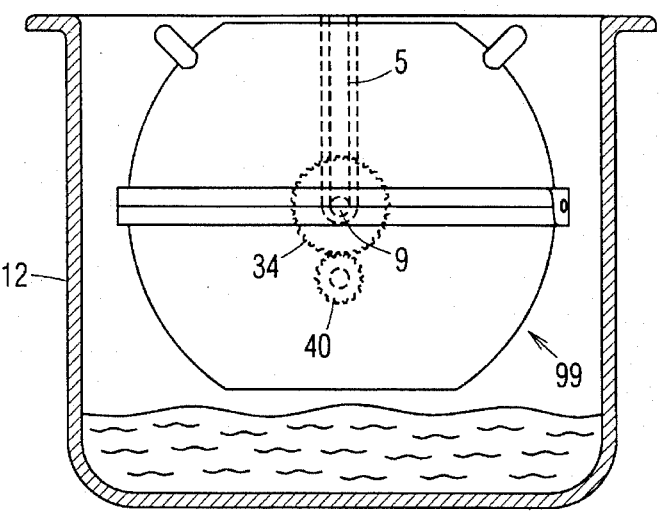
FIG. 4 is a left side cutaway view of the cooking pot showing a "U" shaped support bracket, and placement of the spherical chamber therein.

FIG. 4 is a left side cutaway view of pot 12, showing shaft 9 of spherical chamber assembly 99 being cradled by U-shaped slot 5. Shaft 8 (FIG. 1) is cradled by U-shaped slot 4 (FIG. 1 ). Gear 34 mates with a gear 40 positioned inside pot 12. The lid and stove top are not shown for clarity.

Figure 5:
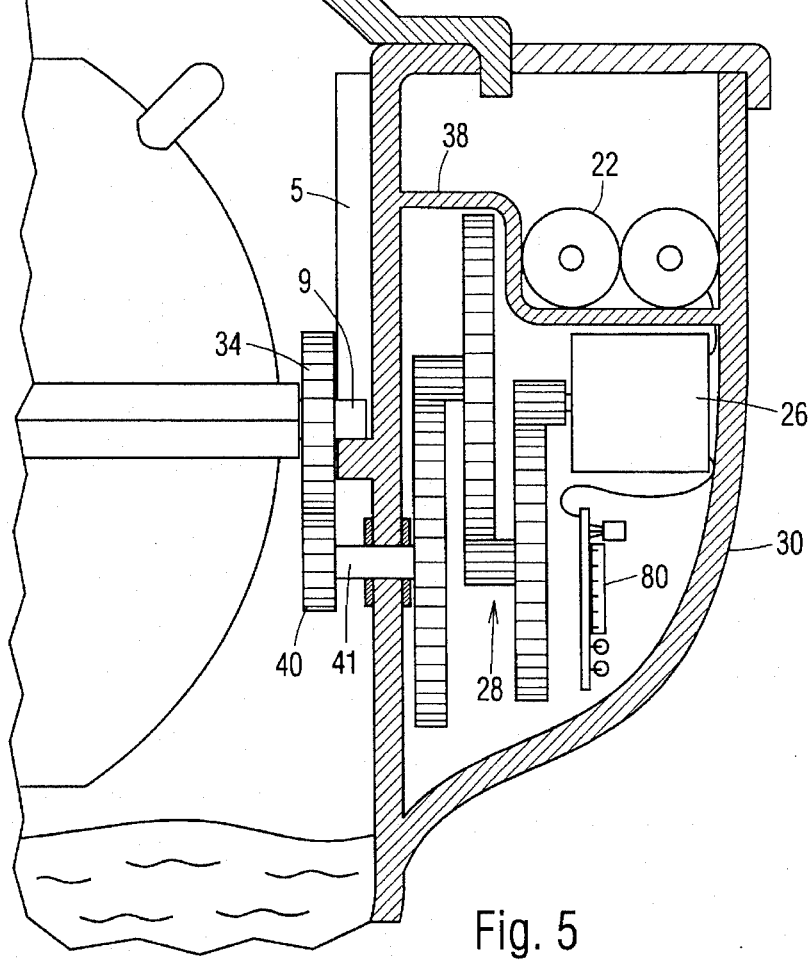
FIG. 5 is a front cutaway view of the cooking pot showing the batteries, motor, and gear drive mechanism.

FIG. 5 is an enlarged cutaway view of pot 12 showing shaft 9 resting on the bottom of U-shaped slot 5. Gear 34 is mated to gear 40, which is fixedly connected to one end of a drive shaft 41 extending through the side wall of pot 12. The other end of shaft 41 is connected to a speed reduction gear train 28, which is driven by a motor 26. Motor 26 is powered by batteries 22. Conventional electronic circuit 80 causes motor 26 to run intermittently, such as five seconds on and five seconds off, to conserve the life of batteries 22. Motor and gear housing 30 is heat resistant, so that gears 28, electronics 80, motor 26, and batteries 22 are protected from the heat emanating from the stove top (FIG. 1). Separating wall 38 further insulates batteries 22 from heat.

Figure 6:
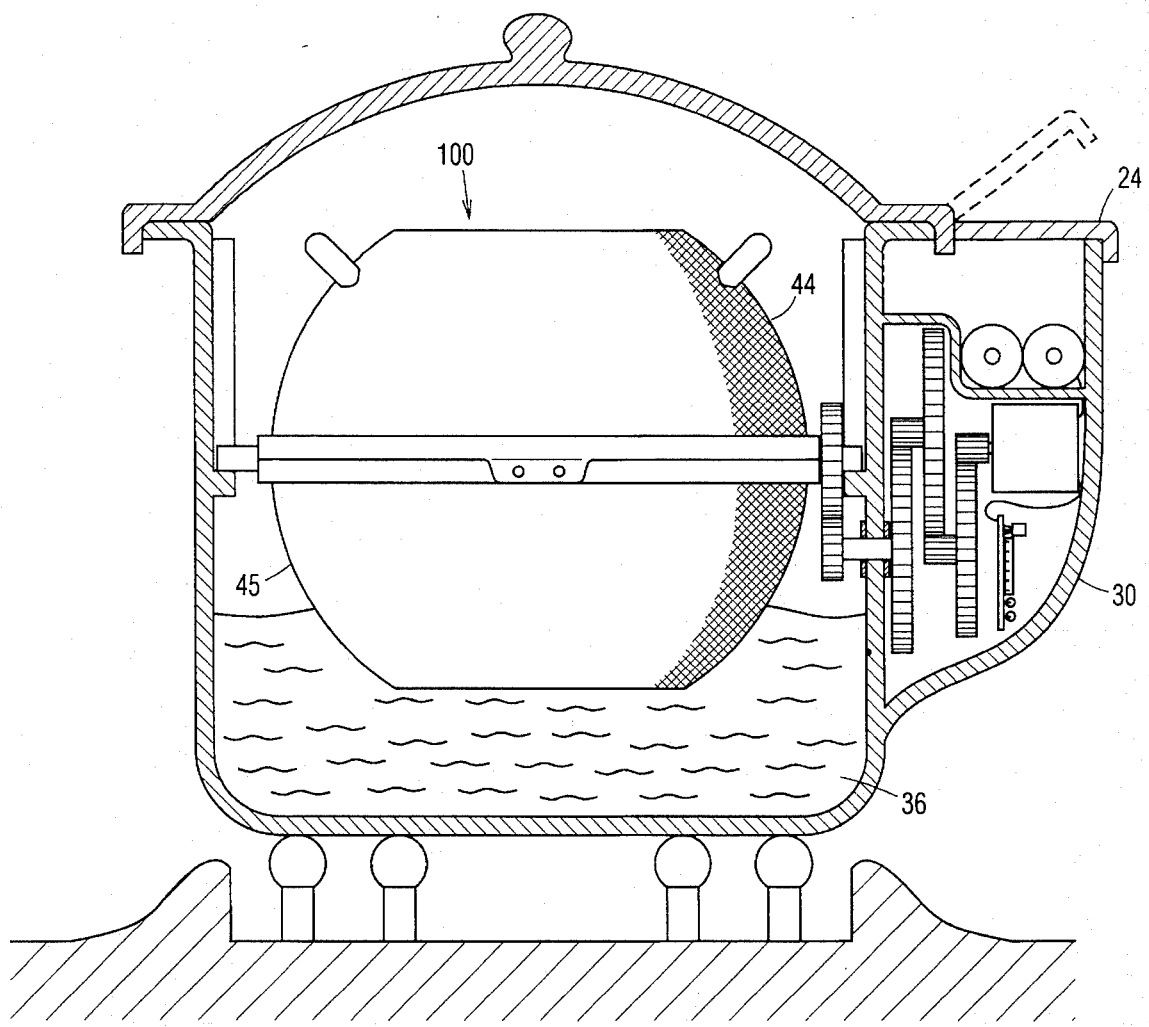
FIG. 6 is a front cutaway view of the cooking pot showing a perforated spherical chamber for steaming rice and vegetables, in accordance with a second embodiment of the invention.

FIG. 6 shows a second embodiment of the cooking pot. A spherical chamber assembly 100 includes two perforated hemispheres 44 and 45, which allow steam to easily penetrate. A movable lid 24 covers housing 30. Spherical chamber assembly 100 is ideal for steaming vegetables or cooking rice. In the case of cooking rice, water level 36 is preferably at the level shown. This allows water to soak the rice during the initial stage of cooking. Rice cooked in this manner is fluffy and not sticky, as is the case in conventional rice cookers.

Figure 7:
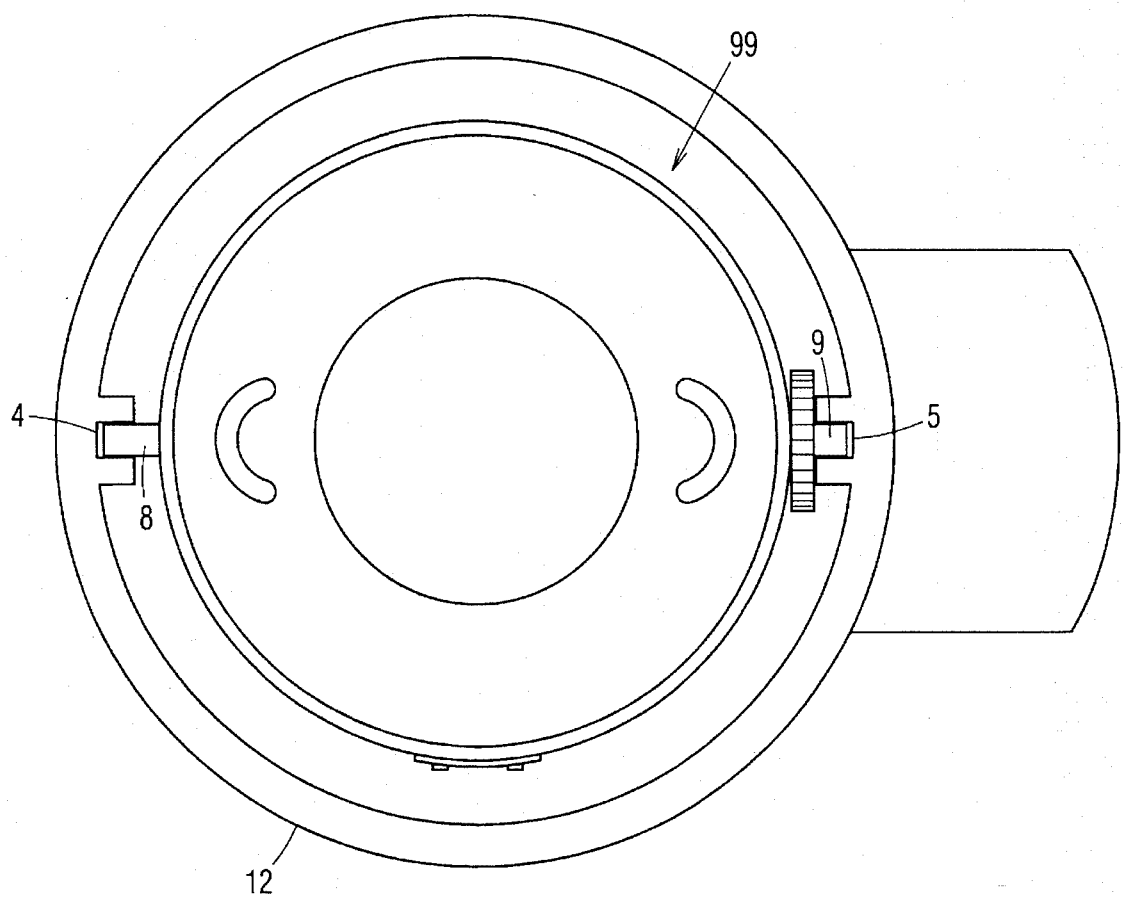
FIG. 7 is a top view of the cooking pot with the lid removed, showing the spherical chamber suspended therein.

FIG. 7 is a top view of the cooking pot, showing shafts 8 and 9 respectively fitted in U-shaped slots 4 and 5. Spherical chamber assembly 99 is suspended ha and spaced from pot 12, so that it may rotate freely without touching the interior walls of pot 12.

Figure 8:
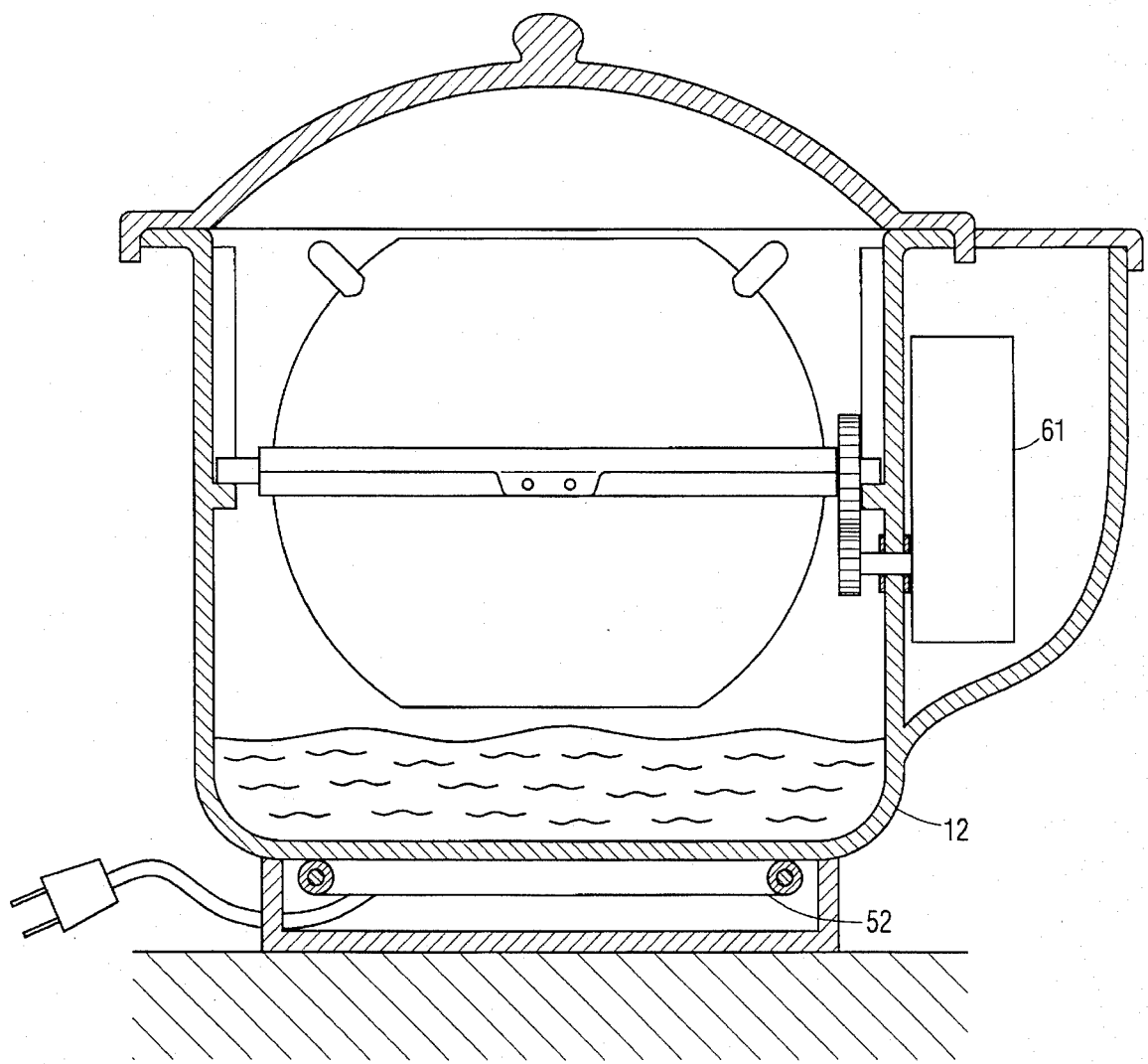
FIG. 8 is a front cutaway view of the cooking pot showing a built-in electric heating element and an AC-powered rotisserie-type drive motor, in accordance with a third embodiment of the invention.

FIG. 8 shows a third embodiment of the cooking pot. An electrical heating coil 52 is fused to the bottom of pot 12, thereby eliminating the need for heating on a stove top. An AC rotisserie-type drive assembly 61 is provided.

Figure 9:
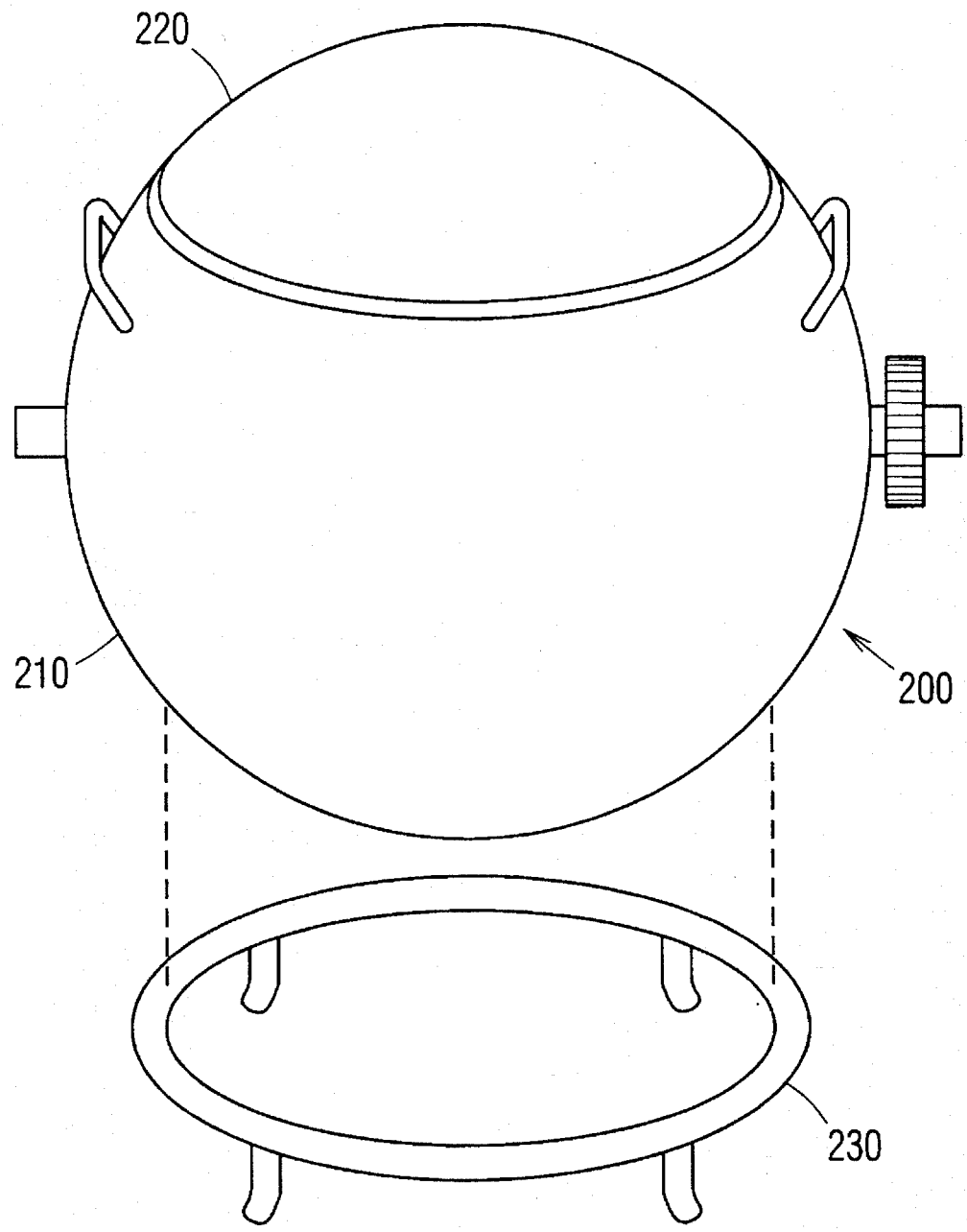
FIG. 9 is a front perspective view of a spherical chamber in accordance with a fourth embodiment of the invention.

FIG. 9 shows a fourth embodiment of the cooking pot. A spherical chamber assembly 200 includes a larger bottom portion 210 and a smaller top portion 220. Top portion 220 serves as a lid, and bottom portion 210 is able to hold more food when lid 220 is opened. A stand 230 supports the underside of spherical chamber assembly 200, and allows it to rest on a surface without rolling.

In all embodiments, the spherical chamber assembly is made of a rigid material, such as stainless steel, aluminum, or high temperature rigid plastic.

Although the present invention has been described in connection with what is considered the most practical and preferred embodiments, it is understood that the invention is not limited to the disclosed embodiments, but includes various arrangements within the spirit and scope of the disclosure, so as to encompass all such modifications and equivalent arrangements.

I claim:

1. A cooking apparatus, comprising:

a cooking pot having an open top and a closed bottom;

a cover removably positioned on said open top of said cooking pot;

a hollow spherical cooking chamber comprising a pair of hemispherical halves hingeably connected together on one side and releasably fastened together on an opposite side, and an annular gasket positioned between said hemispherical halves for providing a seal, said spherical cooking chamber having flattened top and bottom portions;

a pair of horizontal shafts extending from opposite radial positions on said spherical cooking chamber;

a pair of U-shaped support brackets arranged on an interior wall of said cooking pot for supporting said horizontal shafts and suspending said spherical cooking chamber in said cooking pot;

first drive means fixedly attached to one of said horizontal shafts;

second drive means positioned within said cooking pot, said second drive means fixedly attached to one end of a drive shaft extending through said cooking pot, said second drive means engaging said first drive means;

speed reduction means connected to another end of said drive shaft outside of said cooking pot; and an electric motor connected to said speed reduction means, said motor driving said drive shaft through said speed reduction means, so as to rotate said cooking pot about said horizontal shafts.

2. The cooking apparatus of claim 1 further including a battery for powering said motor.

3. The cooking apparatus of claim 1 wherein said first drive means and said second drive means each comprise a gear.

4. The cooking apparatus of claim 1 wherein said speed reduction means comprises a speed reduction gear train.

5. A cooking apparatus, comprising:

a cooking pot having an open top and a closed bottom;

a cover removably positioned on said open top of said cooking pot;

a hollow spherical cooking chamber comprising top and bottom portions, said bottom portion comprising about two thirds of said spherical cooking chamber, said top portion comprising a lid and about one third of said spherical cooking chamber;

a pair of horizontal shafts extending from opposite radial positions on said spherical cooking chamber;

a pair of U-shaped support brackets arranged on an interior wall of said cooking pot for supporting said horizontal shafts and suspending said spherical cooking chamber in said cooking pot;

first drive means fixedly attached to one of said horizontal shafts;

second drive means positioned within said cooking pot, said second drive means fixedly attached to one end of a drive shaft extending through said cooking pot, said second drive means engaging said first drive means;

speed reduction means connected to another end of said drive shaft outside of said cooking pot;

an electric motor connected to said speed reduction means, said motor driving said drive shaft through said speed reduction means, so as to rotate said cooking pot about said horizontal shafts; and a separate ring with a plurality of legs for supporting said spherical cooking chamber when said spherical cooking chamber is removed from said cooking pot.

6. The cooking apparatus of claim 5, further including a removable battery for powering said motor.

7. The cooking apparatus of claim 5 wherein said first drive means and said second drive means each comprise a gear.

8. The cooking apparatus of claim 5 wherein said speed reduction means comprises a speed reduction gear train.

* * * * *